May 5, 1925.
G. W. BURNISTON
VEHICLE JACK
Filed Aug. 8, 1924
1,536,877
3 Sheets-Sheet 1
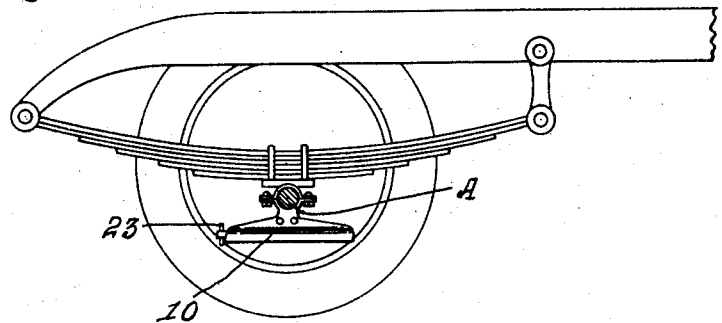
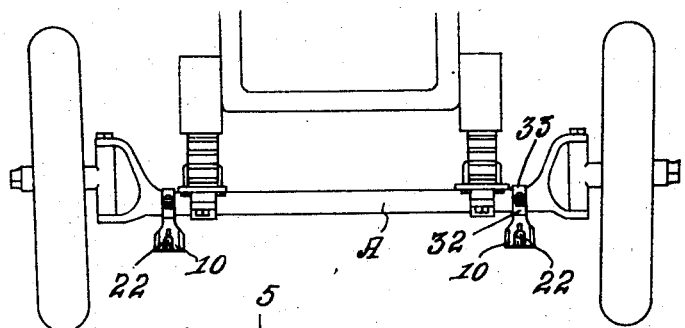
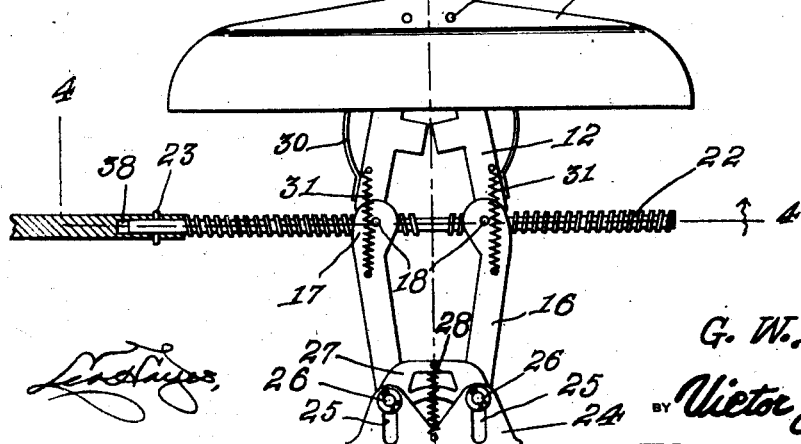
G. W. Burniston
INVENTOR
BY Victor J. Evans
ATTORNEY
WITNESS:

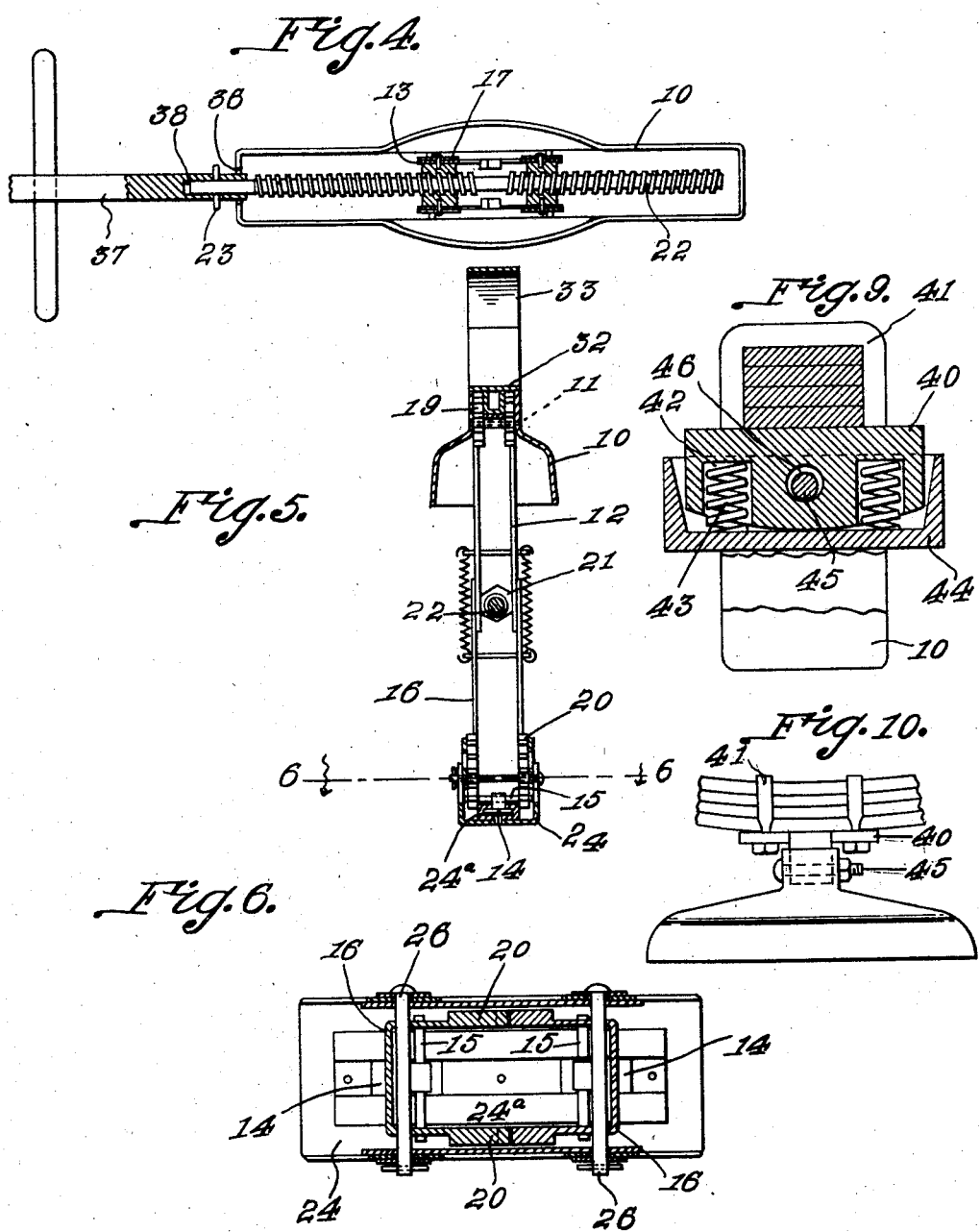

May 5, 1925.

G. W. BURNISTON

VEHICLE JACK

Filed Aug. 8, 1924

1,536,877

3 Sheets-Sheet 3

G. W. Burniston
INVENTOR

BY Victor J. Evans
ATTORNEY

WITNESS:

UNITED STATES PATENT OFFICE.

GEORGE W. BURNISTON, OF CHICAGO, ILLINOIS.

VEHICLE JACK.

Application filed August 8, 1924. Serial No. 730,987.

*To all whom it may concern:*

Be it known that I, GEORGE W. BURNISTON, a citizen of the United States, residing at Chicago, in the county of Cook and State of Illinois, have invented new and useful Improvements in Vehicle Jacks, of which the following is a specification.

This invention relates to vehicle jacks and has for its object the provision of a jack designed to be carried permanently by the vehicle, there being two jacks for each axle, one at each end, it being however within the scope of the invention to modify the structure whereby the jack may be of that structure designed to be carried loose in the tool box.

An important object is the provision of a jack of this character which is so constructed that when in closed position it will be inconspicuous and will not in any way detract from the appearance of the car.

Another object is the provision of a jack device of this character which being always on the axle, or other location on the car, is always ready for instant use, the operation of lifting the vehicle being an extremely simple one requiring very little effort and causing no great degree of annoyance.

A further object is the provision of different means for mounting the device upon the axle or upon portions of the springs or spring mountings, modifications in this respect being necessary on account of variations in the different makes of cars.

An additional object is the provision of a device of this character which will be comparatively simple and inexpensive to manufacture, easy to install and operate, efficient and durable in service and a general improvement in the art.

Figure 7:
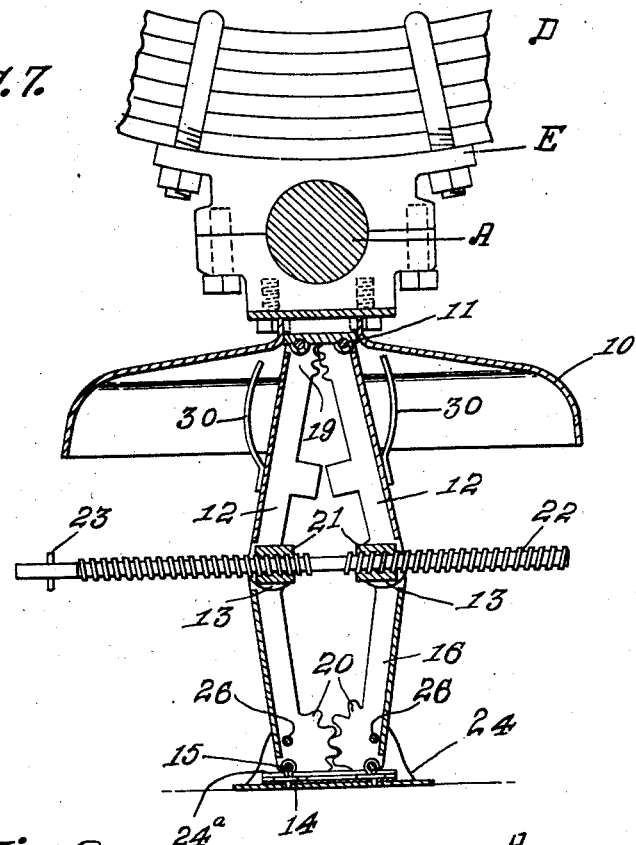
Figure 8:
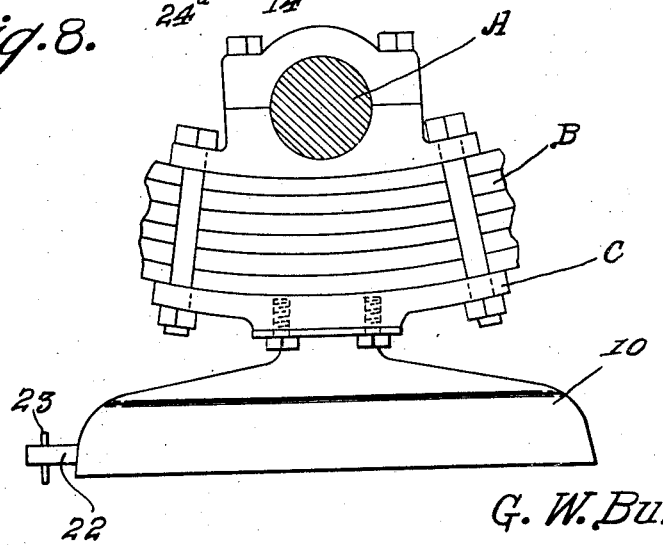

With the above and other objects and advantages in view the invention consists in the details of construction to be hereinafter more fully described and claimed and illustrated in the accompanying drawings, in which:

Figure 1 is an elevation of my device in closed position mounted upon the axle of a vehicle, Figure 2 is an elevation at right angles to Figure 1, Figure 3 is a view similar to Figure 1 showing the device in extended position, the view being on a larger scale, Figure 4 is a horizontal section taken on the line 4—4 of Figure 3, Figure 5 is a vertical cross section taken on the line 5—5 of Figure 3, Figure 6 is a horizontal section taken on the line 6—6 of Figure 5, Figure 7 is a longitudinal section through the device in open position and showing the mode of connection with a spring mounting and axle, Figure 8 is an elevation showing the manner of mounting the device on an under slung construction.

Figures 9 and 10 are detail views showing the spring means for taking up side strain.

Referring more particularly to the drawings I have shown my device as comprising an upper housing member 10 within which are pivoted at 11 the upper ends of the arms 12 which terminate at their other ends in ears 13. The numeral 14 designates a pair of slides upon which are pivoted diverging arms 16 which terminate in ears 17 straddling the ears 13 and pivoted thereto as shown at 18. The upper ends of the arms 12 are formed as fragmentary intermeshing gears 19 and the lower ends of the arms 16 are formed with similar segmental gears 20 so that absolute simultaneous movement of the arms will be assured.

Disposed between the ears 13 are nuts 21 pivoted by the same pivots 18 which hold the ears together and threaded through these nuts are the oppositely threaded ends of an operating screw 22 which is provided at one end with a transverse pin 23.

The numeral 24 represents the base or foot upon which is secured a channel shaped guide 24$^a$ within which the slides 14 are mounted. This foot member 24 has upturned sides formed with slots 25 through which pass bolts 26 which also pass through the arms 16 and through bridge pieces 27 with which are connected springs 28 which are also connected with the bottom portion of the member 24.

In conjunction with the arms 12 I provide leaf springs 30 secured thereto and engageable with the inside of the housing 10, and in conjunction with the arms 12 and 16, I provide coil springs 31, which together with the springs 30, operate to hold the parts firmly and preventing rattling at any time.

In Figures 1, 2 and 3 I have shown the housing member 10 equipped with a species of saddle 32 designed to fit against the underside of an axle A of the vehicle and having co-operating therewith a semicircular clamping band 33 designed to be engaged over the axle, the saddle 32 and band 33 being both provided with attaching ears 34 through which pass bolts 35 for clamping the device with respect to the axle.

In some types of cars the spring B is mounted below the frame element and in this event the upper housing member 10 is bolted onto the spring retainer C as shown in Figure 8.

In other types of vehicles the spring D is above the frame elements and in this instance the upper housing 10 of my device is secured to or formed upon the spring connector or mounting E as shown in Figure 7. Regardless of which form of connection is used, there are two of the devices provided at the front and two at the rear of the car. Ordinarily the devices are in closed position as shown in Figure 1 and it will be observed that the upper housing member 10 is provided with a slot or notch 36 which receives the operating end of the screw. When the devices are thus closed it is quite apparent that they occupy very little space and will in no way detract from the appearance of the car.

When for any reason it is necessary to jack up a wheel, it is merely necessary that the operator employ a suitable handle 37 as shown in Figure 4, this handle being provided in one with a socket 38 adapted to be engaged upon the operating end of the screw, the socket being moreover slotted for engagement upon the pin 23. When the screw is then turned to the left, it is apparent that the oppositely threaded ends thereof engaging through the nuts 21 will straighten out the arms so that the arms 12 will be drawn toward each other and the arms 16 similarly drawn toward each other. This movement results in moving the foot downwardly until it engages the ground whereupon continued operation of the screw will result in lifting the vehicle. In case of any side strain it is apparent that the springs 28 will take care of it and not only prevent injury to the mechanism but also insure proper action.

In some cases particularly it may be found that there is a certain amount of strain. In order to compensate for this and prevent damage to any of the parts as a result thereof, I may make use of the mounting disclosed in Figures 9 and 10. Referring more in detail to the figures, the numeral 40 designates a supporting member which is engaged and held to the spring by means of clips 41 or the like. The underside of the member 40 is formed with sockets 42 within which are located coil springs 43 engaging against the top surface of an upward extension 44 on above described casing member 10. The members 40 and 43 are pivotally connected by a bolt 45 which passes through a hole 46 of somewhat larger diameter whereby to permit a certain amount of play. The lower surface of the member 40 is rounded and owing to the provision of the springs 43 it is evident that there may be a certain limited lateral movement which will positively prevent strain.

From the foregoing description and a study of the drawings it will be apparent that I have thus provided a simply constructed, inexpensive and readily installable jack device which is adapted especially to remain upon the vehicle at all times ready for instant use. It should of course be understood that if preferred the device might be made as a separate tool of the portable type to be carried in the tool box or other convenient location in the car. It is also understood that I reserve the right to make such other changes in the form, construction and arrangement of parts as will not depart from the spirit of the invention or the scope of the subjoined claims.

Having thus described my invention I claim:

1. In a jack of the character described, an upper member, a bottom member, two pairs of toggle arms pivotally connected with each other, one pair being pivotally connected with said top member and the other being pivotally connected with the bottom member, intermeshing teeth formed on the pivoted ends of said toggle arms, nuts pivotally mounted at the junctures of the pairs of arms and formed with opposite threads, and an operating screw having its end portion oppositely threaded and engaged through said nuts, the lower pair of toggle arms being slidably connected with the bottom member.

2. A jack device comprising a housing member carrying means for attachment to a portion of a vehicle, a pair of arms pivoted within said housing member, a foot member, a pair of arms pivotally connected with the foot member and with said first named arms, nuts at the junctures of said arms, and an operating screw having oppositely threaded portions engaging within the respective nuts, said foot members being constructed as a housing mating with said first named housing to define an enclosure, and springs carried by said arms and engageable with the adjacent housing members when said housing members are brought together, whereby to prevent rattling.

3. In a jack of the character described, a base formed with guides, plates slidably mounted along the guides, a pair of upwardly extending toggle arms pivoted upon the base and pivotally connected with the plates, a second pair of toggle arms pivotally connected with the upper ends of the first named arms, a member pivotally connected with the upper ends of the second named toggle arms and provided with means for mounting upon a vehicle, and screw means engaging the toggle arms at their pivotal connections for effecting movement thereof.

4. In combination with a vehicle carried jack structure, the jack including a body member, a block-like member provided with means for engagement upon a portion of a vehicle chassis, a cup-like member carried upon the jack body and engaged exteriorly upon said block member and pivotally connected therewith, and springs interposed between the cup member and block member.

5. In a device of the character described, a casing, means on the casing for effecting securing to a vehicle chassis, a foot member, a channel shaped guide mounted with the foot member, a pair of slides movable within the guide, a pair of arms pivotally connected at their lower ends with the slides, a second pair of arms pivotally connected with the upper ends of the first named arms and pivotally connected with said casing, the opposite sides of the foot member being formed with elongated slots, bolts passing through said slots and through the lower end portions of the first named arms, the upper ends of the second named arms and the lower ends of the first named arms being formed with intermeshing gear teeth, bridge members at opposite sides of the foot member engaged upon said bolts, and springs connected with the foot member and the said bridge members.

In testimony whereof I affix my signature.

GEORGE W. BURNISTON.